United States Patent
Chen et al.

(10) Patent No.: US 11,364,892 B2
(45) Date of Patent: Jun. 21, 2022

(54) SYSTEM AND METHOD FOR CHANGING GEAR RANGES OF A FOUR WHEEL DRIVE VEHICLE

(71) Applicant: Ford Global Technologies, LLC, Dearborn, MI (US)

(72) Inventors: Weitian Chen, Windsor (CA); Zhengyu Dai, Canton, MI (US); Hong Jiang, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 16/547,418

(22) Filed: Aug. 21, 2019

(65) Prior Publication Data

US 2021/0053549 A1    Feb. 25, 2021

(51) Int. Cl.

| *B60W 10/119* | (2012.01) |
| *B60W 10/02* | (2006.01) |
| *B60W 10/08* | (2006.01) |
| *B60K 17/356* | (2006.01) |
| *B60K 23/08* | (2006.01) |
| *B60K 17/02* | (2006.01) |

(Continued)

(52) U.S. Cl.
CPC .......... *B60W 10/119* (2013.01); *B60K 17/02* (2013.01); *B60K 17/356* (2013.01); *B60K 23/0808* (2013.01); *B60W 10/02* (2013.01); *B60W 10/08* (2013.01); *B60W 30/18172* (2013.01); *F16D 48/06* (2013.01); *B60K 2023/085* (2013.01); *B60W 2710/021* (2013.01); *B60W 2710/025* (2013.01); *B60W 2710/081* (2013.01); *B60W 2710/083* (2013.01); *B60Y 2200/91* (2013.01); *B60Y 2400/82* (2013.01); *F16D 2500/1064* (2013.01); *F16D 2500/10431* (2013.01); *F16D 2500/1107* (2013.01)

(58) Field of Classification Search
CPC .... B60W 10/119; B60W 10/02; B60W 10/08; B60W 30/18172; B60W 2710/021; B60W 2710/025; B60W 2710/081; B60W 2710/083; B60K 17/02; B60K 17/356; B60K 23/0808; B60K 2023/085; F16D 48/06; F16D 2500/10431; F16D 2500/1064; F16D 2500/1107; B60Y 2200/91; B60Y 2400/82

See application file for complete search history.

(56) References Cited

U.S. PATENT DOCUMENTS

| 4,664,217 A | 5/1987 | Welch et al. |
| 7,331,899 B2 | 2/2008 | Ortmann et al. |
| 7,517,298 B2 | 4/2009 | Ortmann |

(Continued)

FOREIGN PATENT DOCUMENTS

| CN | 101856968 A | * | 10/2010 | ............. B60K 6/365 |
| CN | 207360073 U | * | 5/2018 | ............. B60K 6/365 |
| WO | WO-2016180806 A1 | * | 11/2016 | ............... B60K 6/24 |

*Primary Examiner* — Tisha D Lewis
(74) *Attorney, Agent, or Firm* — Vincent Mastrogiacomo; McCoy Russell LLP (57) ABSTRACT

Methods and system are described for changing a driveline gear range from a higher gear range to a lower gear range. The driveline may include two electric machines and four clutches in a four wheel drive configuration. The methods and systems permit a driveline to change from a higher gear range to a lower gear range without stopping a vehicle.

10 Claims, 5 Drawing Sheets

(51) Int. Cl.
*B60W 30/18* (2012.01)
*F16D 48/06* (2006.01)

(56) References Cited

U.S. PATENT DOCUMENTS

| | | | | |
|---|---|---|---|---|
| 2004/0200648 | A1* | 10/2004 | Tarasinski | B60L 15/2009 180/65.7 |
| 2009/0152030 | A1* | 6/2009 | Palatov | B60K 17/356 180/65.285 |
| 2009/0233758 | A1* | 9/2009 | Soliman | B60W 10/113 477/3 |
| 2012/0010041 | A1* | 1/2012 | Soliman | B60W 10/02 477/5 |
| 2017/0136867 | A1* | 5/2017 | Holmes | F16H 3/725 |
| 2020/0361303 | A1* | 11/2020 | Meyer | F16H 61/0403 |

\* cited by examiner

SYSTEM AND METHOD FOR CHANGING GEAR RANGES OF A FOUR WHEEL DRIVE VEHICLE

FIELD

The present description relates generally to methods and systems for shifting gear ranges of axles of a four wheel drive electric vehicle. The electric vehicle may include electric machines that may provide power to a front axle and a rear axle.

BACKGROUND/SUMMARY

A vehicle may include two propulsion sources. One propulsion source may selectively supply power to a front axle and the other propulsion source may selectively supply power to a rear axle. Each axle may include a gearbox and the gearbox may include a high range gear and a low range gear. The high range gear may be selectively engaged to operate the vehicle at higher speeds and the low range gear may be selectively engaged to operate the vehicle at lower speeds. In addition, the lower range gear may be selected when it may be desirable to supply larger amounts of wheel torque. For example, the low range gear may be engaged when the vehicle is climbing steeper hills or when the vehicle is traveling through deeper snow or mud.

The gearbox may be shifted into the low range gear from a high range gear via completely stopping the vehicle and manually selecting the low gear range when the vehicle is completely stopped. However, human drivers may find that it is inconvenient to stop the vehicle to shift from a high axle gear range to a low axle gear range. Further, human drivers may find that stopping the vehicle and restarting the vehicle in a different axle gear range to be a time consuming activity that they may not wish to engage in because it may take some additional effort. Nevertheless, if the vehicle is not engaged in the lower range during some conditions, the vehicle may exhibit reduced traction and reduced climbing ability.

The inventors herein have recognized the above-mentioned issues and have developed a method for operating a vehicle, comprising: decreasing output of a first electric machine coupled to a first axle and increasing output of a second electric machine coupled to a second axle in response to a request to disengage a higher gear in the first axle and engage a lower gear in the first axle.

By decreasing output of the first electric machine coupled to the first axle and increasing output of the second electric machine coupled to the second axle, it may be possible to change a driveline from a high gear range to a lower gear range without stopping the vehicle. Further, the driveline may switch from the high gear range to the lower gear range when the vehicle's driver is applying an accelerator pedal. Decreasing the output of the first electric machine allows a first clutch in the first axle to be disengaged without generating a large driveline torque disturbance. Further, increasing output of the second electric machine when output of the first electric machine is being reduced may reduce a likelihood of a wheel torque reduction or of a "torque hole" that may be noticeable to vehicle occupants.

The present description may provide several advantages. In particular, the approach allows a driveline to switch from a higher gear range to a lower gear range without having to stop the vehicle. In addition, the approach allows vehicle speed to be maintained during the shifting from the higher gear range to the lower gear range. The approach also controls clutch slip so that the possibility of clutch degradation may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
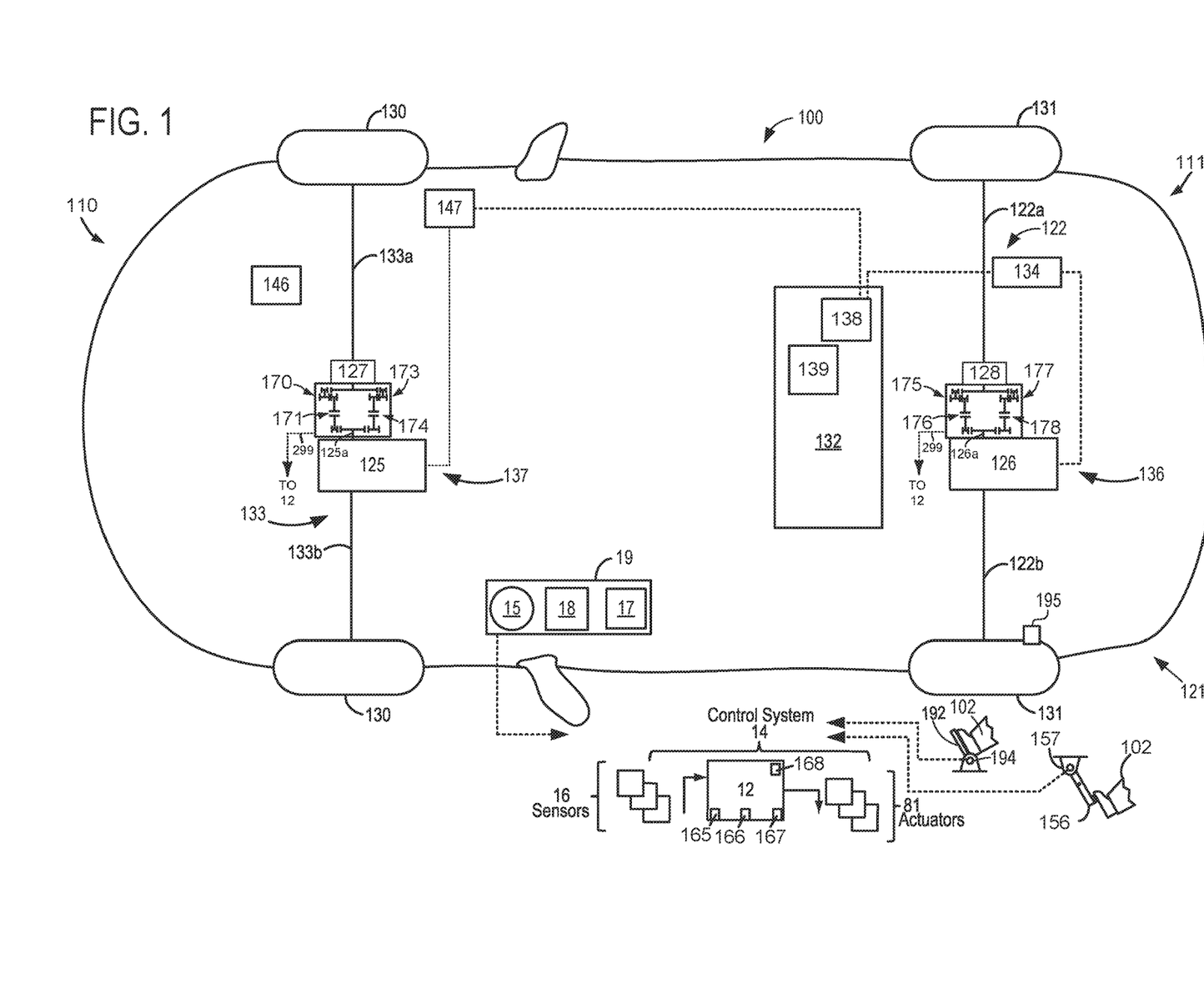
FIG. 1 is a schematic diagram of a vehicle driveline is shown.
Figure 2:
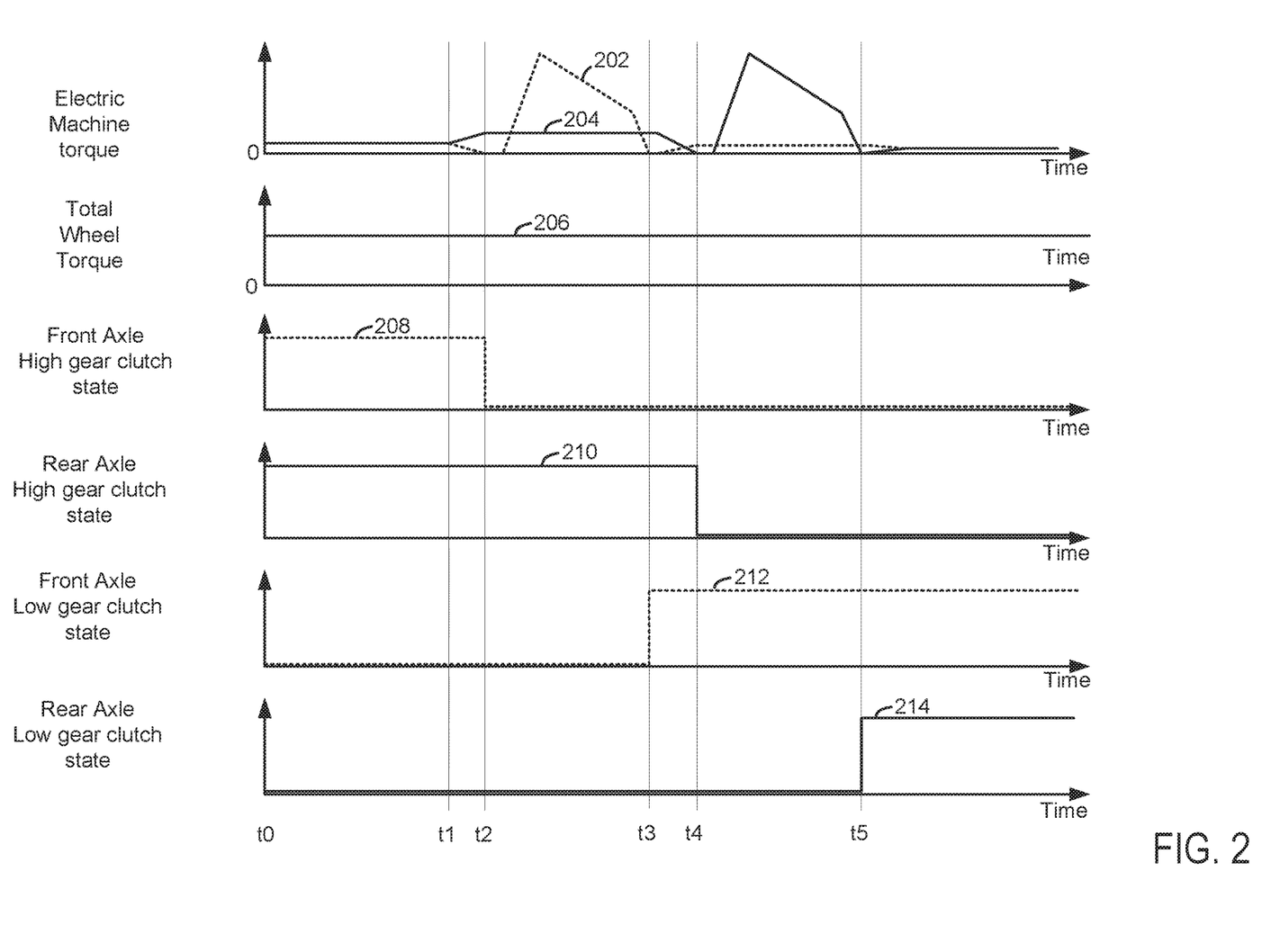
FIGS. 2 and 3 show two different driveline operating sequences.
Figure 3:
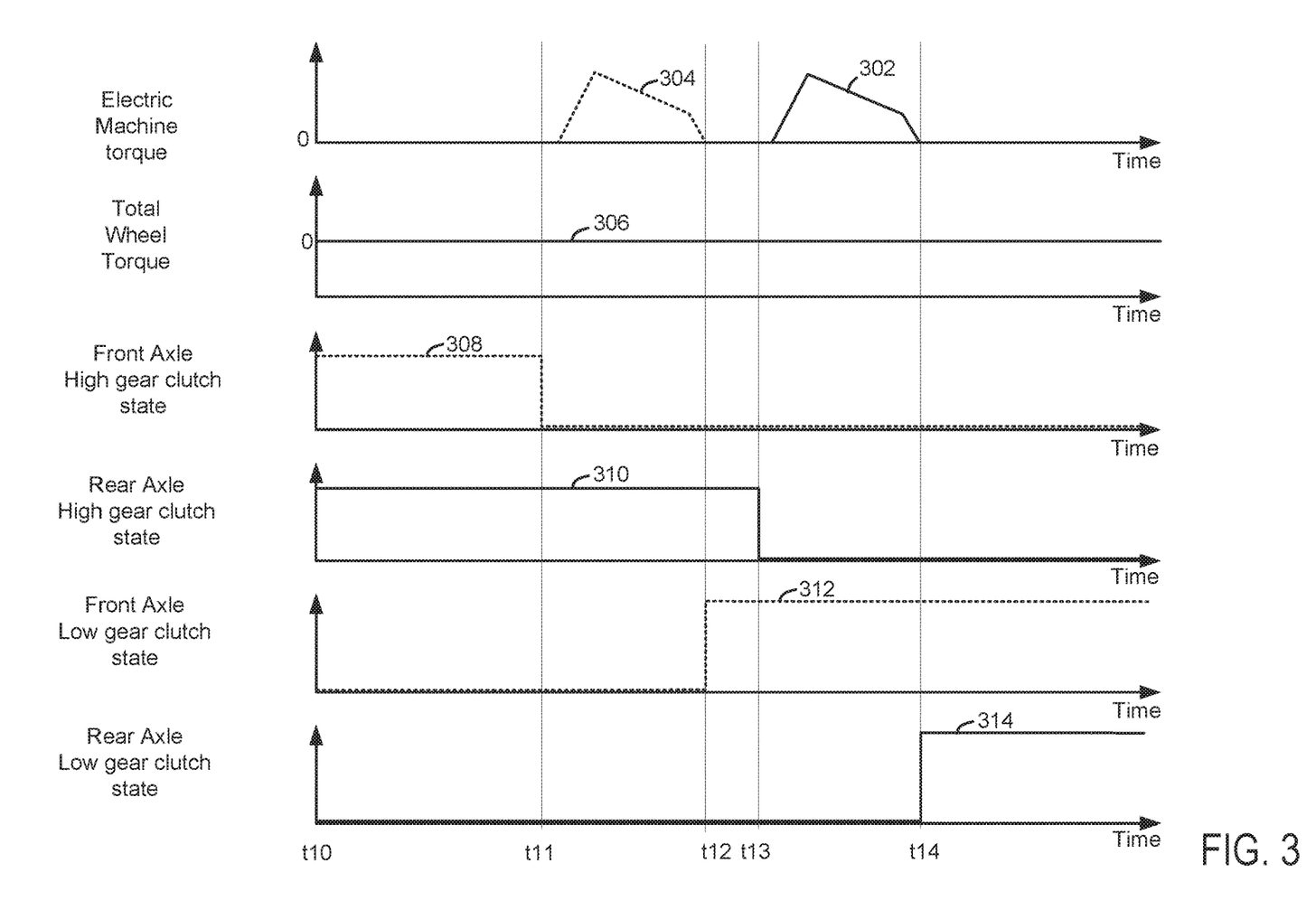

The following description relates to systems and methods for operating a driveline or powertrain of a four wheel drive vehicle. The four wheel drive vehicle may be configured as an electric vehicle, or alternatively, the vehicle may be configured as a hybrid vehicle. An example vehicle and driveline or powertrain is shown in FIG. 1. FIGS. 2 and 3 show example driveline operating sequences according to the method of FIGS. 4 and 5. A method for operating a four wheel drive vehicle and shifting a driveline from a higher gear range to a lower gear range is shown. The method of FIGS. 4 and 5 permits the driveline to be shifted from the higher gear range to the lower gear range while the vehicle is moving and while the vehicle's driver is requesting positive torque via an accelerator pedal or other powertrain input.

FIG. 1 illustrates an example vehicle propulsion system 100 for vehicle 121. A front portion of vehicle 121 is indicated at 110 and a rear portion of vehicle 121 is indicated at 111. Vehicle propulsion system 100 includes at two propulsion sources including front electric machine 125 and rear electric machine 126. Electric machines 125 and 126 may consume or generate electrical power depending on their operating mode. Throughout the description of FIG. 1, mechanical connections between various components are illustrated as solid lines, whereas electrical connections between various components are illustrated as dashed lines.

Vehicle propulsion system 100 has a front axle 133 and a rear axle 122. In some examples, rear axle may comprise two half shafts, for example first half shaft 122a, and second half shaft 122b. Likewise, front axle 133 may comprise a first half shaft 133a and a second half shaft 133b. Vehicle propulsion system 100 further has front wheels 130 and rear wheels 131. In this example, front wheels 130 may be selectively driven via electric machine 125. Rear wheels 131 may be driven via electric machine 126.

The rear axle 122 is coupled to electric machine 126. Rear drive unit 136 may transfer power from electric machine 126 to axle 122 resulting in rotation of drive wheels 131. Rear drive unit 136 may include a low gear set 175 and a high gear 177 that are coupled to electric machine 126 via output shaft 126a of rear electric machine 126. Low gear 175 may be engaged via fully closing low gear clutch 176. High gear 177 may be engaged via fully closing high gear clutch 178.

High gear clutch 177 and low gear clutch 178 may be opened and closed via commands received by rear drive unit 136 over CAN 299. Alternatively, high gear clutch 177 and low gear clutch 178 may be opened and closed via digital outputs or pulse widths provided via control system 14. Rear drive unit 136 may include differential 128 so that torque may be provided to axle 122a and to axle 122b. In some examples, an electrically controlled differential clutch (not shown) may be included in rear drive unit 136.

The front axle 133 is coupled to electric machine 125. Front drive unit 137 may transfer power from electric machine 125 to axle 133 resulting in rotation of drive wheels 130. Front drive unit 137 may include a low gear set 170 and a high gear 173 that are coupled to electric machine 125 via output shaft 125a of front electric machine 125. Low gear 170 may be engaged via fully closing low gear clutch 171. High gear 173 may be engaged via fully closing high gear clutch 174. High gear clutch 174 and low gear clutch 171 may be opened and closed via commands received by front drive unit 137 over CAN 299. Alternatively, high gear clutch 174 and low gear clutch 171 may be opened and closed via digital outputs or pulse widths provided via control system 14. Front drive unit 137 may include differential 127 so that torque may be provided to axle 133a and to axle 133b. In some examples, an electrically controlled differential clutch (not shown) may be included in rear drive unit 137.

Electric machines 125 and 126 may receive electrical power from onboard electrical energy storage device 132. Furthermore, electric machines 125 and 126 may provide a generator function to convert the vehicle's kinetic energy into electrical energy, where the electrical energy may be stored at electric energy storage device 132 for later use by the electric machine 125 and/or electric machine 126. A first inverter system controller (ISC1) 134 may convert alternating current generated by rear electric machine 126 to direct current for storage at the electric energy storage device 132 and vice versa. A second inverter system controller (ISC2) 147 may convert alternating current generated by front electric machine 125 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 125, electric machine 126, energy storage device 132, etc. Control system 14 may receive sensory feedback information from one or more of electric machine 125, electric machine 126, energy storage device 132, etc. Further, control system 14 may send control signals to one or more of electric machine 125, electric machine 126, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) (not shown), wheel speed sensor(s) 195, etc. In some examples, sensors associated with electric machine 125, electric machine 126, wheel speed sensor 195, etc., may communicate information to controller 12, regarding various states of electric machine operation. Controller 12 includes non-transitory (e.g., read only memory) 165, random access memory 166, digital inputs/outputs 168, and a microcontroller 167.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 125 and electric machine 126) based on an operator input. Various examples of the operator ignition interface 15 may include interfaces that require a physical apparatus, such as an active key, that may be inserted into the operator interface 15 to start the electric machines 125 and 126 and to turn on the vehicle, or may be removed to shut down the electric machines 125 and 126 to turn off the vehicle. Other examples may include a passive key that is communicatively coupled to the operator interface 15. The passive key may be configured as an electronic key fob or a smart key that does not have to be inserted or removed from the interface 15 to operate the vehicle electric machines 125 and 126. Rather, the passive key may need to be located inside or proximate to the vehicle (e.g., within a threshold distance of the vehicle). Still other examples may additionally or optionally use a start/stop button that is manually pressed by the operator to start or shut down the electric machines 125 and 126 to turn the vehicle on or off. In other examples, a remote electric machine start may be initiated remote computing device (not shown), for example a cellular telephone, or smartphone-based system where a user's cellular telephone sends data to a server and the server communicates with the vehicle controller 12 to start the engine.

The system of FIG. 1 provides for a vehicle system, comprising: a first electric machine coupled to a front axle; a second electric machine coupled to a rear axle; a controller including executable instructions stored in non-transitory memory to decrease output of the first electric machine and increase output of the second electric machine in response to a request to switch a driveline from a higher gear range to a lower gear range. The system further comprises additional instructions to decrease output of the second electric machine and increase output of the first electric machine in response to the request to switch a driveline from the higher gear range to the lower gear range. The system includes where the output of the second electric machine is decreased after the output of the second electric machine is increased. The system further comprises a first clutch in the front axle and a second clutch in the front axle. The system further comprises additional instructions to open the first clutch and close the second clutch in response to the request to switch the driveline from the higher gear range to the lower gear range.

Figure 4:
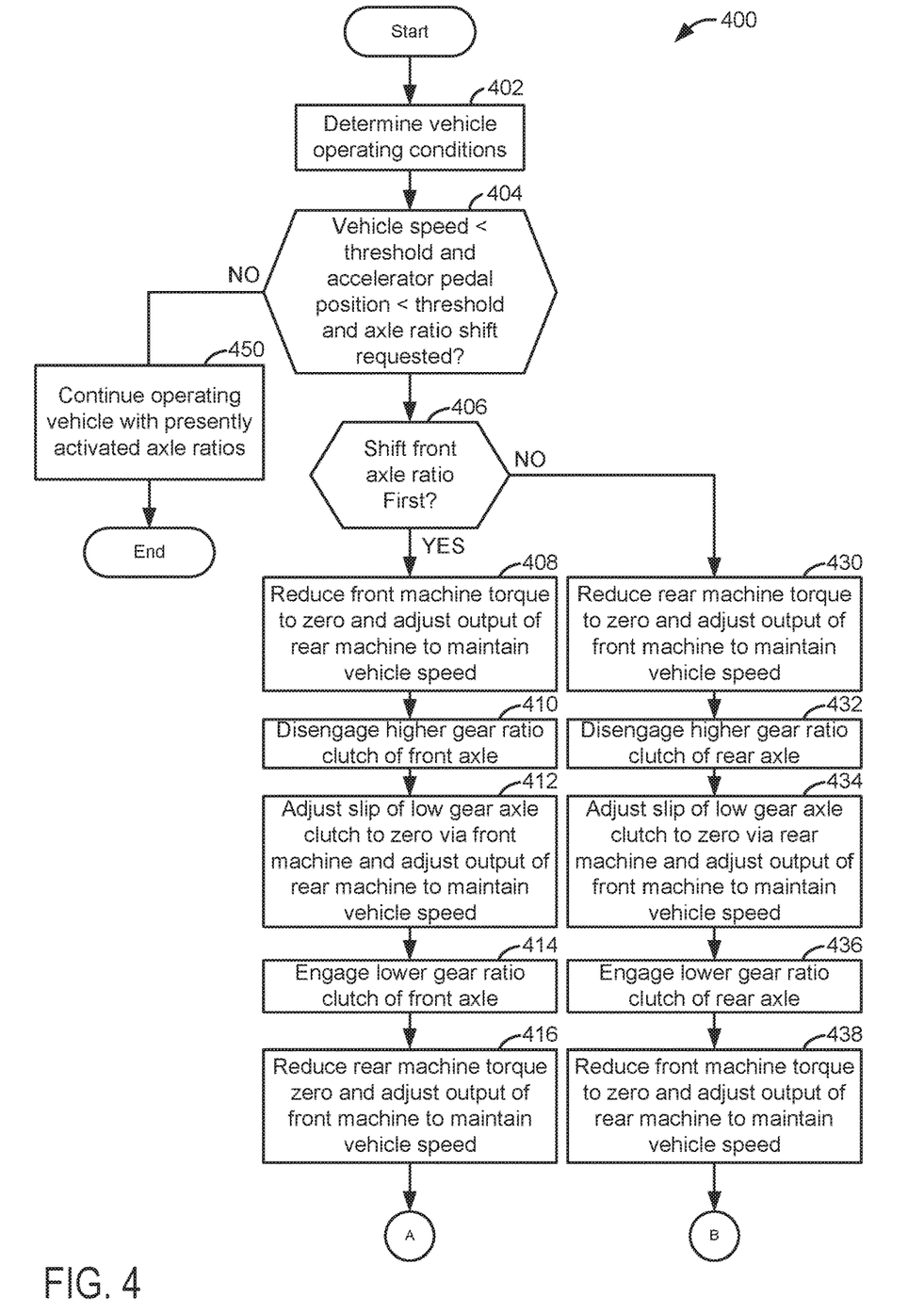
FIGS. 4 and 5 show an example of a method for operating a driveline of a four wheel drive vehicle.
Figure 5:
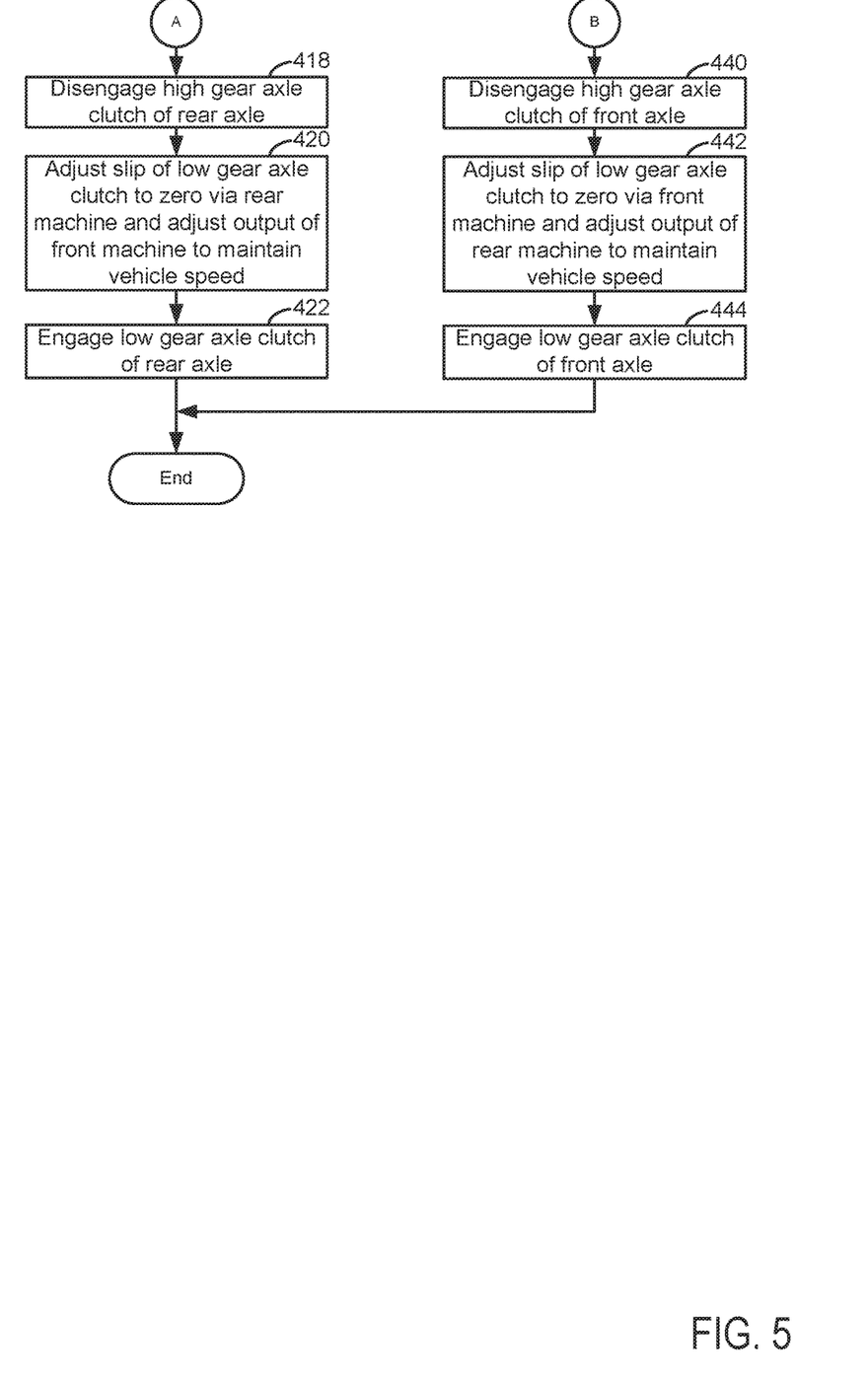

Referring now to FIG. 2, a prophetic vehicle operating sequence according to the method of FIGS. 4 and 5 is shown. The vehicle operating sequence shown in FIG. 2 may be provided via the method of FIGS. 4 and 5 in cooperation with the system shown in FIG. 1. The plots shown in FIG. 2 occur at the same time and are aligned in time. The vertical lines at t0-t5 represent times of interest during the sequence. The sequence of FIG. 2 takes place when an accelerator pedal is applied by a driver such that the wheel torque request is non-zero and while the vehicle is moving on a road.

The first plot from the top of FIG. 2 is a plot of electric machine torque versus time. The vertical axis represents electric machine torque and the electric machine torque increases in the direction of the vertical axis arrow. The horizontal axis represents time and time increases from the left side of the figure to the right side of the figure. Trace 204 represents the rear axle electric machine torque. Trace 202 represents the front axle electric machine torque.

The second plot from the top of FIG. 2 is a plot of total wheel torque (e.g., sum of front wheel torque and rear wheel torque) versus time. The vertical axis represents the total wheel torque at the vehicle's wheels and the magnitude of the total wheel torque increases in the direction of the vertical axis arrow. The horizontal axis represents time and time increases from the left side of the figure to the right side of the figure. Line 206 represents the total wheel torque (e.g., the torque of all four wheels).

The third plot from the top of FIG. 2 is a plot of front axle high gear clutch operating state versus time. The vertical axis represents front axle high gear clutch operating state and the front axle high gear clutch operating state is closed when a trace 208 is at a higher level near the vertical axis arrow. The horizontal axis represents time and time increases from the left side of the figure to the right side of the figure. Trace 208 represents the front axle high gear clutch state.

The fourth plot from the top of FIG. 2 is a plot of rear axle high gear clutch operating state versus time. The vertical axis represents rear axle high gear clutch operating state and the rear axle high gear clutch operating state is closed when a trace 210 is at a higher level near the vertical axis arrow. The horizontal axis represents time and time increases from the left side of the figure to the right side of the figure. Trace 210 represents the rear axle high gear clutch state.

The fifth plot from the top of FIG. 2 is a plot of front axle low gear clutch operating state versus time. The vertical axis represents front axle low gear clutch operating state and the front axle low gear clutch operating state is closed when a trace 212 is at a higher level near the vertical axis arrow. The horizontal axis represents time and time increases from the left side of the figure to the right side of the figure. Trace 212 represents the front axle low gear clutch state.

The sixth plot from the top of FIG. 2 is a plot of rear axle low gear clutch operating state versus time. The vertical axis represents rear axle low gear clutch operating state and the rear axle low gear clutch operating state is closed when a trace 214 is at a higher level near the vertical axis arrow. The horizontal axis represents time and time increases from the left side of the figure to the right side of the figure. Trace 214 represents the rear axle low gear clutch state.

At time t0, the front electric machine torque and the rear electric machine torque are non-zero and based on a non-zero or applied accelerator pedal position (not shown). The total wheel torque is at a middle level and the front axle and rear axle high gear clutches are fully closed. The front axle and rear axle low gear clutches are fully open. Thus, the driveline is in a high gear range suitable for driving the vehicle at higher speeds.

At time t1, a request to change the driveline from the higher gear range to a lower gear range occurs (not shown). The sequence shown begins by changing the gear ratio of the front axle followed by changing the gear ratio of the rear axle. The output torque of the front electric machine begins to be reduced and the output of the rear electric machine begins to be increased. This allows vehicle speed to be maintained and reduces the possibility of a generating a "torque hole" (e.g., a reduction in driveline torque that may reduce vehicle speed and may be noticeable to vehicle occupants) in driveline torque output. Thus, vehicle drivability may be improved. The total wheel torque remains constant while the torque of the front and rear electric machines is changing. The front axle high gear clutch and the rear axle high gear clutch are fully closed. Thus, high gears of the front and rear axles are engaged to allow the electric machines to provide torque to the wheels via the front and rear axle high gears. The front axle low gear clutch and the rear axle low gear clutch are fully open so that electric machine torque is not transferred through the front axle lower gear and the rear axle lower gear.

At time t2, the output torque of the front electric machine reaches zero and the front axle high gear clutch is fully opened in response to the front electric machine torque being zero. The rear electric machine torque output has leveled off and the total wheel torque has remained constant. The front axle low gear clutch remains fully open and the rear axle high gear clutch remains fully closed to allow the vehicle to be propelled solely via the rear electric machine. The rear axle low gear clutch remains fully open.

Between time t2 and time t3, the front axle electric machine torque is increased until the speed of the front axle electric machine output shaft is equal to a speed of the front axle lower gear. The front axle lower gear speed is a function of vehicle speed. The front axle electric machine torque is reduced after speed of the front axle electric machine output shaft is equal to the speed of the front axle lower gear. The front axle low gear clutch remains fully open and the rear axle high gear clutch remains fully closed. The rear axle low gear clutch remains fully open.

At time t3, the front axle electric machine torque is reduced to zero and the front axle lower gear clutch is fully engaged in response to the front axle electric machine torque being zero. This allows torque transfer from the front electric machine to the front wheels via the lower axle gear. The rear axle high gear clutch remains fully closed and the rear axle low gear clutch remains fully open.

Between time t3 and time t4, the front axle electric machine torque is increased and the rear axle electric machine torque is decreased to prepare shifting of the rear axle gears. The front axle high gear clutch remains fully open and the front axle low gear clutch remains fully closed. The rear axle high gear clutch remains fully closed and the rear axle low gear clutch remains fully open. Thus, the front electric machine delivers torque to the front axle via the front axle low gear and the rear electric machine delivers torque to the rear axle via the rear axle high gear.

At time t4, the output torque of the rear electric machine reaches zero and the rear axle high gear clutch is fully opened in response to the rear electric machine torque being zero. The front electric machine torque output has leveled off and the total wheel torque has remained constant. The rear axle low gear clutch remains fully open and the front axle low gear clutch remains fully closed to allow the vehicle to be propelled solely via the front electric machine. The rear axle low gear clutch remains fully open and the front axle high gear clutch is fully open.

Between time t4 and time t5, the rear axle electric machine torque is increased until the speed of the rear axle electric machine output shaft is equal to a speed of the rear axle lower gear. The rear axle lower gear speed is a function of vehicle speed. The rear axle electric machine torque is reduced after speed of the rear axle electric machine output shaft is equal to the speed of the rear axle lower gear. The rear axle low gear clutch remains fully open and the front axle low gear clutch remains fully closed. The rear axle high gear clutch remains fully open.

At time t5, the rear axle electric machine torque is reduced to zero and the rear axle lower gear clutch is fully engaged in response to the rear axle electric machine torque being zero. This allows torque transfer from the rear electric machine to the rear wheels via the lower axle gear. The front axle low gear clutch remains fully closed and the front axle high gear clutch remains fully open.

In this way, wheel torque of a vehicle may remain substantially constant (e.g., less than a 5% change in torque) while a driveline changes from a high gear range to a low gear range. Further, speeds of the electric machines may be closed loop controlled so that driveline torque disturbances may be low.

Referring now to FIG. 3, a second prophetic vehicle operating sequence according to the method of FIGS. 4 and 5 is shown. The vehicle operating sequence shown in FIG. 2 may be provided via the method of FIGS. 4 and 5 in cooperation with the system shown in FIG. 1. The plots shown in FIG. 2 occur at the same time and are aligned in time. The vertical lines at t10-t14 represent times of interest during the sequence. The sequence of FIG. 3 takes place when an accelerator pedal is not applied by a driver such that the wheel torque request is zero and while the vehicle is moving on a road.

The first plot from the top of FIG. 3 is a plot of electric machine torque versus time. The vertical axis represents electric machine torque and the electric machine torque increases in the direction of the vertical axis arrow. The horizontal axis represents time and time increases from the left side of the figure to the right side of the figure. Trace 304 represents the rear axle electric machine torque. Trace 302 represents the front axle electric machine torque.

The second plot from the top of FIG. 3 is a plot of total wheel torque (e.g., sum of front wheel torque and rear wheel torque) versus time. The vertical axis represents the total wheel torque at the vehicle's wheels and the magnitude of the total wheel torque increases in the direction of the vertical axis arrow. The horizontal axis represents time and time increases from the left side of the figure to the right side of the figure. Line 306 represents the total wheel (e.g., torque of all four wheels) torque.

The third plot from the top of FIG. 3 is a plot of front axle high gear clutch operating state versus time. The vertical axis represents front axle high gear clutch operating state and the front axle high gear clutch operating state is closed when a trace 308 is at a higher level near the vertical axis arrow. The horizontal axis represents time and time increases from the left side of the figure to the right side of the figure. Trace 308 represents the front axle high gear clutch state.

The fourth plot from the top of FIG. 3 is a plot of rear axle high gear clutch operating state versus time. The vertical axis represents rear axle high gear clutch operating state and the rear axle high gear clutch operating state is closed when a trace 310 is at a higher level near the vertical axis arrow. The horizontal axis represents time and time increases from the left side of the figure to the right side of the figure. Trace 310 represents the rear axle high gear clutch state.

The fifth plot from the top of FIG. 3 is a plot of front axle low gear clutch operating state versus time. The vertical axis represents front axle low gear clutch operating state and the front axle low gear clutch operating state is closed when a trace 312 is at a higher level near the vertical axis arrow. The horizontal axis represents time and time increases from the left side of the figure to the right side of the figure. Trace 312 represents the front axle low gear clutch state.

The sixth plot from the top of FIG. 3 is a plot of rear axle low gear clutch operating state versus time. The vertical axis represents rear axle low gear clutch operating state and the rear axle low gear clutch operating state is closed when a trace 314 is at a higher level near the vertical axis arrow. The horizontal axis represents time and time increases from the left side of the figure to the right side of the figure. Trace 314 represents the rear axle low gear clutch state.

At time t10, the front electric machine torque and the rear electric machine torque are zero and based on zero accelerator pedal position (not shown). The total wheel torque is also zero and rear axle high gear clutches are fully closed. The front axle and rear axle low gear clutches are fully open. Thus, the driveline is in a high gear range suitable for driving the vehicle at higher speeds.

At time t11, a request to change the driveline from the higher gear range to a lower gear range occurs (not shown). The sequence shown begins by changing the gear ratio of the front axle followed by changing the gear ratio of the rear axle. The output torque of the front electric machine remains at zero and the output of the rear electric machine remains at zero. The total wheel torque remains zero. The front axle high gear clutch is fully opened and the rear axle high gear clutch is fully closed. Thus, high gear of the front axle is disengaged to begin the front axle shift and rear axle remains engaged in case there is an increase in requested wheel torque so that the driveline may respond by increasing output of the rear electric machine. The front axle low gear clutch and the rear axle low gear clutch are fully open.

Between time t11 and time t12, the front axle electric machine torque is increased until the speed of the front axle electric machine output shaft is equal to a speed of the front axle lower gear. The front axle lower gear speed is a function of vehicle speed. The front axle electric machine torque is reduced after speed of the front axle electric machine output shaft is equal to the speed of the front axle lower gear. The front axle low gear clutch remains fully open and the rear axle high gear clutch remains fully closed. The rear axle low gear clutch remains fully open.

At time t12, the front axle electric machine torque is reduced to zero and the front axle lower gear clutch is fully engaged in response to the front axle electric machine torque being zero. The rear axle high gear clutch remains fully closed and the rear axle low gear clutch remains fully open.

At time t13, the rear axle high gear clutch is fully opened in response to shifting of the front axle gear being completed. The rear axle low gear clutch remains fully open and the front axle low gear clutch remains fully closed to in case driver demand torque is increased.

Between time t13 and time t14, the rear axle electric machine torque is increased until the speed of the rear axle electric machine output shaft is equal to a speed of the rear axle lower gear. The rear axle lower gear speed is a function of vehicle speed. The rear axle electric machine torque is reduced after speed of the rear axle electric machine output shaft is equal to the speed of the rear axle lower gear. The rear axle low gear clutch remains fully open and the front axle low gear clutch remains fully closed. The rear axle high gear clutch remains fully open.

At time t15, the rear axle lower gear clutch is fully engaged in response to the rear axle electric machine torque being zero. The front axle low gear clutch remains fully closed and the front axle high gear clutch remains fully open.

In this way, wheel torque of a vehicle may remain substantially constant (e.g., less than a 5% change in torque) while a driveline changes from a high gear range to a low gear range. Further, speeds of the electric machines may be closed loop controlled so that driveline torque disturbances may be low.

Referring now to FIGS. 4 and 5, an example method for operating a vehicle that includes a first electric machine coupled to a front or first axle and a second electric machine coupled to a rear or second axle is shown. The method of FIGS. 4 and 5 may be incorporated into and may cooperate with the system of FIG. 1. Further, at least portions of the method of FIGS. 4 and 5 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to vehicle speed, accelerator pedal position, operating states of axle clutches, present wheel torque, and brake pedal position. Method 400 proceeds to 404.

At 404, method 400 judges if vehicle speed is less than a threshold speed, accelerator pedal is less than a threshold application amount, and a driveline shift from high gear ratios of axles being engaged to lower gear ratios of the axles being engaged is requested. In one example, the threshold speed may be a speed that is less than a predetermined speed (e.g., 60 kilometers/hour) and the threshold accelerator pedal application amount is a predetermined amount (e.g., less than 50% of full scale accelerator pedal position). A request to shift a driveline from high gear ratios of axles to low gear ratios of axles may be made via a vehicle operator and a human/machine interface. Alternatively, a request to request to shift the driveline from the high gear ratios of axles to the low gear ratios of the axles may be made automatically in response to vehicle operating conditions. For example, a request to shift a driveline from high gear ratios of axles to low gear ratios of axles may be made when vehicle speed is less than a threshold speed or when wheel slip exceeds a threshold level. If method 400 judges that there is a request to shift a driveline from high gear ratios of axles to low gear ratios of axles, the answer is yes and method 400 proceeds to 406. Otherwise, the answer is no and method 400 proceeds to 450.

At 450, method 400 continues to operate the driveline with gears of axles engaged in their present configuration. For example, if method 400 judges that the driveline is operating with high gear ratios of axles engaged, the driveline continues to operate with high gear ratios of the axles engaged. Method 400 proceeds to exit.

At 406, method 400 judges if it is desired to shift the front axle from its higher gear ratio to its lower gear ratio before shifting the rear axle from its higher gear ratio to its lower gear ratio. Method 400 may judge to shift the front axle from its higher gear ratio to its lower gear ratio before shifting the rear axle from its higher gear ratio to its lower gear ratio based on road conditions, wheel slip, or other conditions. For example, if method 400 judges that wheel slip of the vehicle's rear wheels is present while wheel slip of front wheels is not present, then method 400 may judge to shift the front axle from its higher gear ratio to its lower gear ratio before shifting the rear axle from its higher gear ratio to its lower gear ratio so that a high level of traction may be maintained at the front axle. If method 400 judges that to shift the front axle from its higher gear ratio to its lower gear ratio before shifting the rear axle from its higher gear ratio to its lower gear ratio, the answer is yes and method 400 proceeds to 408. Otherwise, the answer is no and method 400 proceeds to 430.

At 408, method 400 reduces torque output of a front axle electric machine to zero and increases torque output of a rear axle electric machine to maintain vehicle speed via maintaining wheel torque to a wheel torque that was present immediately before the request to shift the driveline from a higher gear ratio to a lower gear ratio. Such operation may be commanded when the accelerator pedal is applied and wheel torque is non-zero. However, method 400 may not change torque output of a front axle electric machine if the output of the front axle electric machine is zero immediately before the request to shift the driveline from a higher gear ratio to a lower gear ratio. Further, method 400 may not change torque output of the rear axle electric machine if output of the rear axle electric machine is zero immediately before the request to shift the driveline from a higher gear ratio to a lower gear ratio. Method 400 proceeds to 410.

At 410, method 400 disengages the front axle high gear clutch in response to the torque of the front axle electric machine being zero. However, if wheel torque is zero immediately before the request to shift the driveline from the higher gear range to the lower gear range, then method 400 may disengage the high gear ratio clutch in response to the request to shift the driveline from the higher gear range to the lower gear range. Method 400 proceeds to 412.

At 412, method 400 adjusts slip of the front axle lower gear clutch. In other words, method 400 adjusts a speed difference across the front axle lower gear clutch to zero. In one example, method 400 operates the front axle electric machine in a speed control mode (e.g., electric machine torque is adjusted so that front axle electric machine speed follows a requested or desired speed). Method 400 may increase a rotational speed of an output shaft of the front axle electric machine so that the rotational speed of the output shaft of the front axle electric machine is equal to a rotational speed of a low gear of the front axle. Once the rotational speed of the output shaft of the front axle electric machine is equal or nearly equal to the rotational speed of the low gear of the front axle, torque of the front axle electric machine is reduced.

In one example, the front axle electric machine may be operated in a closed-loop speed control mode that utilizes a proportional/integral controller and that relies on speed feedback of the lower gear to drive a speed error between the rotational speed of the front axle electric machine and the speed of the front axle lower gear to zero.

Method 400 also adjusts torque output of the rear axle electric machine to meet driver demand torque (e.g., torque requested via a human driver via applying an accelerator pedal). If driver demand torque is increased, method 400 increases torque of the rear axle electric machine so that the driveline responds to the driver demand torque. If driver demand torque does not increase, method 400 maintains total wheel torque (e.g., the sum of torques applied to all vehicle wheels) at the amount the total wheel torque was immediately before the driveline shift from the higher gear range to the lower gear range was requested. Method 400 proceeds to 414.

At 414, method 400 fully closes the low gear clutch of the front axle to engage the lower gear of the front axle. Method 400 may fully engage the low gear clutch in response to the output torque of the front electric machine being zero after the output shaft of the front axle electric machine is accelerated to the rotational speed of the front axle low gear. Method 400 proceeds to 416.

At 416, method 400 reduces torque output of a rear axle electric machine to zero and increases torque output of a front axle electric machine to maintain vehicle speed via maintaining total wheel torque to a wheel torque that was present immediately before the request to shift the driveline from a higher gear ratio to a lower gear ratio. The rear axle electric machine torque may be reduced to zero in response to fully closing the low gear clutch of the front axle. However, method 400 may not change torque output of a rear axle electric machine if the output of the rear axle electric machine is zero immediately before the request to shift the driveline from a higher gear ratio to a lower gear ratio. Further, method 400 may not change torque output of the front axle electric machine if output of the front axle electric machine is zero immediately before the request to shift the driveline from a higher gear ratio to a lower gear ratio. Method 400 proceeds to 418.

At 418, method 400 disengages the rear axle high gear clutch in response to the torque of the rear axle electric machine being zero. However, if wheel torque is zero immediately before the request to shift the driveline from the higher gear range to the lower gear range, then method 400 may disengage the rear axle high gear clutch in response to the front axle low gear clutch being fully closed. Method 400 proceeds to 420.

At 420, method 400 adjusts slip of the rear axle lower gear clutch. In other words, method 400 adjusts a speed difference across the rear axle low gear clutch to zero. In one example, method 400 operates the rear axle electric machine in a speed control mode (e.g., electric machine torque is adjusted so that electric machine speed follows a requested or desired speed). Method 400 may increase a rotational speed of an output shaft of the rear axle electric machine so that the rotational speed of the output shaft of the rear axle electric machine is equal to a rotational speed of the rear axle low gear. Once the rotational speed of the output shaft of the rear axle electric machine is equal or nearly equal to the rotational speed of the rear axle low gear, torque of the front axle electric machine is reduced.

In one example, the rear axle electric machine may be operated in a closed-loop speed control mode that utilizes a proportional/integral controller and that relies on speed feedback of the lower gear to drive a speed error between the rotational speed of the rear axle electric machine and the speed of the rear axle lower gear to zero.

Method 400 also adjusts torque output of the front axle electric machine to meet driver demand torque (e.g., torque requested via a human driver via applying an accelerator pedal). If driver demand torque is increased, method 400 increases torque of the front axle electric machine so that the driveline responds to the driver demand torque. If driver demand torque does not increase, method 400 maintains total wheel torque (e.g., the sum of torques applied to all vehicle wheels) at the amount the total wheel torque was immediately before the driveline shift from the higher gear range to the lower gear range was requested. Method 400 proceeds to 422.

At 422, method 400 fully closes the low gear clutch of the rear axle to engage the rear axle lower gear. Method 400 may fully engage the rear axle low gear clutch in response to the output torque of the rear electric machine being zero after the output shaft of the electric machine is accelerated to the rotational speed of the rear axle low gear. Method 400 proceeds to exit.

At 430, method 400 reduces torque output of a rear axle electric machine to zero and increases torque output of a front axle electric machine to maintain vehicle speed via maintaining wheel torque to a wheel torque that was present immediately before the request to shift the driveline from a higher gear ratio to a lower gear ratio. Such operation may be commanded when the accelerator pedal is applied and wheel torque is non-zero. However, method 400 may not change torque output of a rear axle electric machine if the output of the rear axle electric machine is zero immediately before the request to shift the driveline from a higher gear ratio to a lower gear ratio. Further, method 400 may not change torque output of the front axle electric machine if output of the front axle electric machine is zero immediately before the request to shift the driveline from a higher gear ratio to a lower gear ratio. Method 400 proceeds to 432.

At 432, method 400 disengages the rear axle high gear clutch in response to the torque of the rear axle electric machine being zero. However, if wheel torque is zero immediately before the request to shift the driveline from the higher gear range to the lower gear range, then method 400 may disengage the high gear ratio clutch of the rear axle in response to the request to shift the driveline from the higher gear range to the lower gear range. Method 400 proceeds to 434.

At 434, method 400 adjusts slip of the rear axle lower gear clutch. In other words, method 400 adjusts a speed difference across the lower gear clutch to zero. In one example, method 400 operates the rear axle electric machine in a speed control mode (e.g., electric machine torque is adjusted so that electric machine speed follows a requested or desired speed). Method 400 may increase a rotational speed of an output shaft of the rear axle electric machine so that the rotational speed of the output shaft of the rear axle electric machine is equal to a rotational speed of a low gear of the rear axle. Once the rotational speed of the output shaft of the rear axle electric machine is equal or nearly equal to the rotational speed of the low gear of the rear axle, torque of the rear axle electric machine is reduced.

In one example, the rear axle electric machine may be operated in a closed-loop speed control mode that utilizes a proportional/integral controller and that relies on speed feedback of the lower gear to drive a speed error between the rotational speed of the rear axle electric machine and the speed of the rear axle lower gear to zero.

Method 400 also adjusts torque output of the front axle electric machine to meet driver demand torque (e.g., torque requested via a human driver via applying an accelerator pedal). If driver demand torque is increased, method 400 increases torque of the front axle electric machine so that the driveline responds to the driver demand torque. If driver demand torque does not increase, method 400 maintains total wheel torque (e.g., the sum of torques applied to all vehicle wheels) at the amount the total wheel torque was immediately before the driveline shift from the higher gear range to the lower gear range was requested. Method 400 proceeds to 436.

At 436, method 400 fully closes the low gear clutch of the rear axle to engage the lower gear of the rear axle. Method 400 may fully engage the low gear clutch in response to the output torque of the rear electric machine being zero after the output shaft of the rear electric machine is accelerated to the rotational speed of the rear axle low gear. Method 400 proceeds to 438.

At 438, method 400 reduces torque output of a front axle electric machine to zero and increases torque output of a rear axle electric machine to maintain vehicle speed via maintaining total wheel torque to a wheel torque that was present immediately before the request to shift the driveline from a higher gear ratio to a lower gear ratio. The front axle electric machine torque may be reduced to zero in response to fully closing the low gear clutch of the rear axle. However, method 400 may not change torque output of a front axle electric machine if the output of the rear axle electric machine is zero immediately before the request to shift the driveline from a higher gear ratio to a lower gear ratio. Further, method 400 may not change torque output of the rear axle electric machine if output of the rear axle electric machine is zero immediately before the request to shift the driveline from a higher gear ratio to a lower gear ratio. Method 400 proceeds to 440.

At 440, method 400 disengages the front axle high gear clutch in response to the torque of the front axle electric machine being zero. However, if wheel torque is zero immediately before the request to shift the driveline from the higher gear range to the lower gear range, then method 400 may disengage the front axle high gear clutch in response to the rear axle low gear clutch being fully closed. Method 400 proceeds to 442.

At 442, method 400 adjusts slip of the front axle lower gear clutch. In other words, method 400 adjusts a speed difference across the front axle low gear clutch to zero. In one example, method 400 operates the front axle electric machine in a speed control mode (e.g., electric machine torque is adjusted so that electric machine speed follows a requested or desired speed). Method 400 may increase a rotational speed of an output shaft of the front axle electric machine so that the rotational speed of the output shaft of the front axle electric machine is equal to a rotational speed of the front axle low gear. Once the rotational speed of the output shaft of the front axle electric machine is equal or nearly equal to the rotational speed of the front axle low gear, torque of the rear axle electric machine is reduced.

In one example, the front axle electric machine may be operated in a closed-loop speed control mode that utilizes a proportional/integral controller and that relies on speed feedback of the lower gear to drive a speed error between the rotational speed of the front axle electric machine and the speed of the front axle lower gear to zero.

Method 400 also adjusts torque output of the rear axle electric machine to meet driver demand torque (e.g., torque requested via a human driver via applying an accelerator pedal). If driver demand torque is increased, method 400 increases torque of the rear axle electric machine so that the driveline responds to the driver demand torque. If driver demand torque does not increase, method 400 maintains total wheel torque (e.g., the sum of torques applied to all vehicle wheels) at the amount the total wheel torque was immediately before the driveline shift from the higher gear range to the lower gear range was requested. Method 400 proceeds to 444.

At 444, method 400 fully closes the low gear clutch of the front axle to engage the front axle lower gear. Method 400 may fully engage the low gear clutch of the front axle in response to the output torque of the front electric machine being zero after the output shaft of the front electric machine is accelerated to the rotational speed of the front axle low gear. Method 400 proceeds to exit.

Thus, the method of FIGS. 4 and 5 may shift the higher gear of the front axle into a lower gear of the front axle before shifting the higher gear of the rear axle to the lower gear of the rear axle. Alternatively, the method of FIGS. 4 and 5 may shift the higher gear of the rear axle into a lower gear of the rear axle before shifting the higher gear of the front axle to the lower gear of the front axle. Further, the method of FIGS. 4 and 5 may be performed when driver demand is non-zero and while the vehicle is moving. Vehicle operators may find such driveline gear changing to be efficient and time saving.

The method of FIGS. 4 and 5 provide for a method for operating a vehicle, comprising: decreasing output of a first electric machine coupled to a first axle and increasing output of a second electric machine coupled to a second axle in response to a request to disengage a higher gear in the first axle and engage a lower gear in the first axle. The method further comprises opening a first clutch coupled to higher gear in response to the request to disengage the higher gear in the first axle. The method further comprises closing a second clutch coupled to the lower gear in response to the request to disengage the higher gear in the first axle, the second clutch included in the first axle. The method includes where the first axle is a front axle and where the second axle is a rear axle. The method includes where the first axle is a rear axle and where the second axle is a front axle. The method further comprises adjusting output of the first electric machine to reduce slip of the second clutch after opening the first clutch. The method includes where adjusting the output of the first electric machine includes increasing torque output of the electric machine when the first clutch and the second clutch are fully open.

The method of FIGS. 4 and 5 also provides for a method for operating a vehicle, comprising: decreasing output of a first electric machine coupled to a first axle and increasing output of a second electric machine coupled to a second axle in response to a request to switch a driveline from a higher gear range to a lower gear range; and decreasing output of the second electric machine and increasing output of a first electric machine in response to the request to switch the driveline from the higher gear range to the lower gear range. The method includes where the higher gear range is switched to the lower gear range via disengaging a higher gear in the first axle and engaging a lower gear in the first axle. The method includes where the higher gear range is switched to the lower gear range via disengaging a higher gear in a second axle and engaging a lower gear in the second. The method includes where first axle is a front axle and the second axle is a rear axle. The method includes where the first axle is a rear axle and the second axle is a front axle.

The method of FIGS. 4 and 5 may also further comprise opening a first clutch coupled to a higher gear in response to the request to switch the driveline from the higher gear range to the lower gear range. The method further comprises adjusting output of the first electric machine to reduce slip of a second clutch in response to the request to switch the driveline from the higher gear range to the lower gear range. The method includes where adjusting output of the first electric machine includes increasing torque output of the first electric machine to accelerate a speed of the first electric machine up to a speed of a gear.

In another representation, the method of FIGS. 4 and 5 provides for decreasing output of a first electric machine coupled to a first axle and increasing output of a second electric machine coupled to a second axle in response to a request to disengage a higher gear in the first axle and engage a lower gear in the first axle; and operating the first electric machine in a speed control mode after opening a high gear clutch of the first axle, a speed of the first electric machine controlled to a speed of a lower gear of the first axle while operating the first electric machine in the speed control mode. The method further comprises closing a low gear clutch in response to the first electric machine reaching a speed of the lower gear of the first axle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
decreasing output of a first electric machine coupled to a first axle and increasing output of a second electric machine coupled to a second axle in response to a request to disengage a higher gear in the first axle and engage a lower gear in the first axle;
opening a first clutch coupled to higher gear in response to the request to disengage the higher gear in the first axle;
closing a second clutch coupled to the lower gear in response to the request to disengage the higher gear in the first axle, the second clutch included in the first axle; and
adjusting output of the first electric machine to reduce slip of the second clutch after opening the first clutch.

2. The method of claim 1, where the first axle is a front axle and where the second axle is a rear axle.

3. The method of claim 1, where the first axle is a rear axle and where the second axle is a front axle.

4. The method of claim 1, where adjusting the output of the first electric machine includes increasing torque output of the electric machine when the first clutch and the second clutch are fully open.

5. A method for operating a vehicle, comprising:
  decreasing output of a first electric machine coupled to a first axle and increasing output of a second electric machine coupled to a second axle in response to a request to switch a driveline from a higher gear range to a lower gear range;
  decreasing output of the second electric machine and increasing output of the first electric machine in response to the request to switch the driveline from the higher gear range to the lower gear range;
  opening a first clutch coupled to a higher gear in response to the request to switch the driveline from the higher gear range to the lower gear range; and
  adjusting output of the first electric machine to reduce slip of a second clutch in response to the request to switch the driveline from the higher gear range to the lower gear range.

6. The method of claim 5, where the higher gear range is switched to the lower gear range via disengaging a higher gear in the first axle and engaging a lower gear in the first axle.

7. The method of claim 6, where the higher gear range is switched to the lower gear range via disengaging a higher gear in a second axle and engaging a lower gear in the second axle.

8. The method of claim 7, where first axle is a front axle and the second axle is a rear axle.

9. The method of claim 8, where the first axle is a rear axle and the second axle is a front axle.

10. The method of claim 5, where adjusting output of the first electric machine includes increasing torque output of the first electric machine to accelerate a speed of the first electric machine up to a speed of the lower gear.

\* \* \* \* \*